July 15, 1924.

M. U. RAMSAY ET AL

AUTOMATIC MACHINE FOR PROFILING TOOLS

Filed Aug. 15, 1921    2 Sheets-Sheet 1

1,501,496

Inventors
M.U. Ramsay
D.M. Moeglen
By Marks & Clerk Attys.

July 15, 1924.

M. U. RAMSAY ET AL 1,501,496

AUTOMATIC MACHINE FOR PROFILING TOOLS

Filed Aug. 15, 1921    2 Sheets-Sheet 2

Inventors
M. U. Ramsay
D. M. Moeglen
By Marks & Clerk
Attys.

Patented July 15, 1924.

1,501,496

UNITED STATES PATENT OFFICE.

MARCEL ULYSSE RAMSAY AND DÉSIRÉ MARIE MOEGLEN, OF BOIS-COLOMBES, FRANCE.

AUTOMATIC MACHINE FOR PROFILING TOOLS.

Application filed August 15, 1921. Serial No. 492,299.

*To all whom it may concern:*

Be it known that we, MARCEL ULYSSE RAMSAY and DÉSIRÉ MARIE MOEGLEN, respectively citizens of the Swiss Republic and of the French Republic, residing at Bois-Colombes, Seine, in the Republic of France, have invented new and useful Improvements in Automatic Machines for Profiling Tools, of which the following is a specification.

This invention relates to a compound reproducing device which is applicable to the machine cutting of all pieces to any suitable profile, and particularly to pieces which it is proposed to obtain at different scales by the use of a single standard template or gauge, the said device obtaining in the reduced form an exact copy of the profile of the standard.

The machine described hereunder by way of example has been constructed chiefly for the purpose of obtaining milling cutters having a constant profile for use in gear cutting, but it is also applicable to the preparation of all suitable milling cutters with constant profile as well as to the machine cutting of all desired profiles.

For the preparation of such milling cutters with constant profile, the current practice has been to make use of templates and gauges of various forms which it was necessary to construct for each size of milling cutter, but with the machine according to our invention, a traveling tool of the usual type which remains always the same is employed to automatically produce all varieties of milling cutters or like tools but having different sizes, by means of a single standard gauge.

The principle of operation of this machine consists in the combination of two simultaneous movements which are perpendicular to each other, one of the said movements effecting the reduction of the abscissæ to a determined scale and the other movement effecting the reduction of the ordinates to the same scale, in the case of any suitable geometrical figure.

The accompanying drawings which are given by way of example show various embodiments of this invention.

Figure 4:
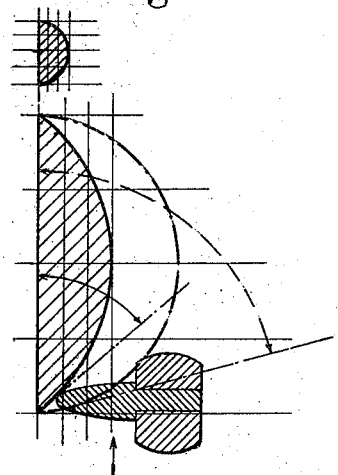
Figure 5:
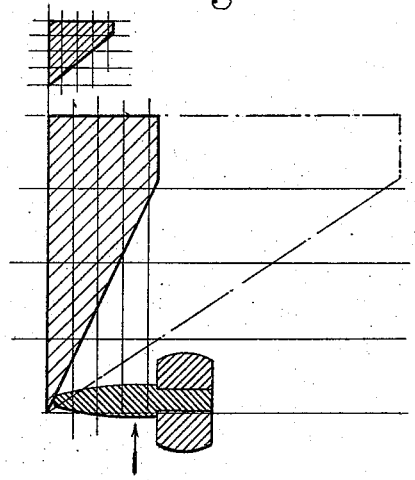

Figs. 4 and 5 indicate the method of preparing the standard templates in such manner that the contact member or pointer shall not enter in contact with the same at prohibitive angles.

Fig. 6 is a longitudinal axial section of a detail of the machine, on a larger scale.

Figure 1:
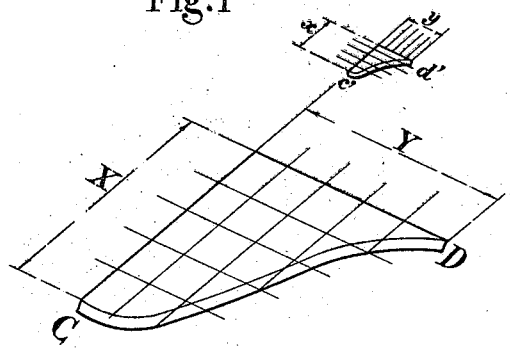
Fig. 1 shows two corresponding profiles which are obtained by reduction.
Figure 2:
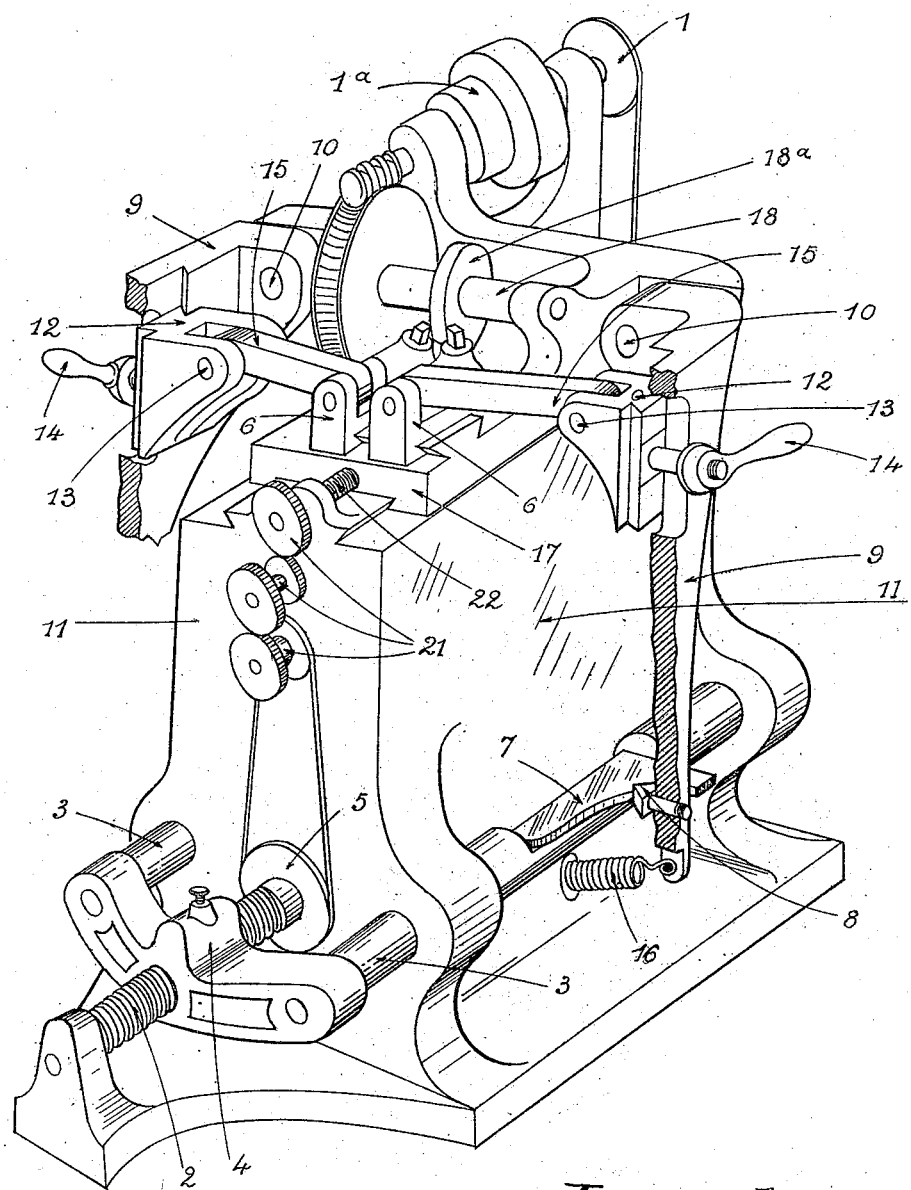
Fig. 2 is a perspective view in elevation of a machine according to this invention.

It will be observed in Fig. 1 that if the abscissæ X and the ordinates Y of the profile C—D are reduced in the same ratio, the corresponding profile $c'$ $d'$ will be obtained which is formed by the reduced values $x$, $y$ and that any slight errors in the execution of the profile C—D of the standard template will be reduced in the corresponding ratio. In the machine represented in Fig. 2 the reduction of the ordinates is obtained by the variable ratios of the lever arm controlling the cross feed of the tool holders 6, and the reduction of the abscissæ is obtained by means of a screw 22 controlling the lengthwise feed of the said tool holders and actuated by a gear set 21 whose ratio may be varied in order to bring them into the proper correspondence with the cross feed.

The machine comprises two levers 9 having a variable ratio and oppositely situated in order to act at the same time upon both sides of the milling cutter under operation. The machine is driven by a belt disposed upon one of the steps of the cone pulley $1^a$ which effects the rotation of the piece under operation $18^a$, which in this case is displaced in front of the tools by means of a known device while at the same time rotating in order to produce the relieving.

A wheel 1 secured to the cone pulley $1^a$ is caused to actuate by a transmission, not shown, the lower screw 2 whereupon is displaced a threaded fork 4 controlling the two slidable members carrying the standard templates 7. The ratio of said transmission may of course be varied by changing the pinions constituting the same. The contact members 8 secured to the levers 9 cause the said levers to swing about the fixed axle pin 10 secured to the framework 11. The adjustable and slidable supports 12, which also carry a pivot axle 13 whose center is located on the line connecting the fixed axle pin and the edge of the contact member, are secured by means of the nuts 14 to the levers 9 to which they are firmly fixed after adjustment to a suitable distance from the axle pin 10 in order to obtain the desired ratio of reduction.

The supports 12 are connected by the links 15 to the tool holders 6 to which they communicate the reduced cross movement which has been given to them by the contact of the members 8 and the templates 7 during the stroke of the sliding members 3. The contact between the said contact members and the templates is obtained by the springs 16 connecting the ends of the levers 9, or by counterweights, not shown. In its rotation, the screw 2 actuates the gear wheel 5 which (by means of a gear set 21 whose ratio may be varied in order to produce the correspondence between the lengthwise feed and the cross feed given to the tool holders 6 by the standard template 7) produces by means of the screw 22 the lengthwise feed of the carriage 17 whereupon are mounted the tool holders 6.

Figure 3:
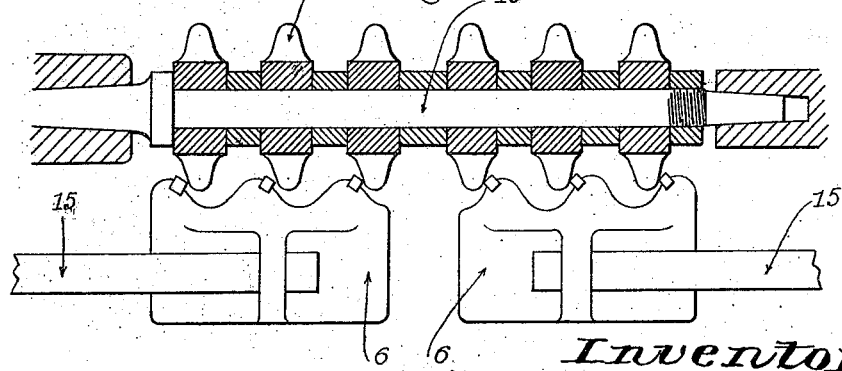
Fig. 3 shows a device for the machine production of any suitable number of milling cutters at the same time.

By reason of the combination of the lengthwise and cross movements given to the tools, a considerable number of milling cutters having different moduli in French and British measurements may be produced with a single template established for a given number of teeth. The herein described arrangement also permits of operating at the same time upon any suitable number of milling cutters disposed upon the mandrel 18, Fig. 3. It will suffice to mount upon the tool holders 6 the number of tools corresponding to the number of milling cutters under operation.

Aside from the milling cutters used for gear cutting operations, the herein described machine will afford a means for effecting the reproduction of profiles which have been considered as impossible to reproduce by reason of the nature of the angles of contact which prevent the sliding movement of the contact member upon the reproducing device.

In Figs. 4 and 5, it is shown that by adopting for the abscissæ a scale which is double, triple, quadruple, etc., that of the ordinates, a template may be produced which will not cooperate with the contact member 8 of the lever 9 at prohibitive angles, and that all desired profiles may be obtained by means of the herein described machine by adopting suitable relations between the lengthwise and cross feeds of the tool holders.

It is obvious that this invention is not limited to the forms of construction hereinbefore described and represented, and that the same may comprise all modifications which do not depart from the principle of the said invention as set forth in the preceding description.

Having now described our invention, what we claim as new and desire to secure by Letters Patent is:

1. An automatic machine for profiling tools, comprising in combination a frame, a work holder, means for rotating said work holder, a tool holder, a template, two longitudinal screws adapted to impart a lengthwise translation to said tool holder and to said template respectively, means for rotating one of said screws, a transmission gear between said screws, a spring controlled lever adapted to pivot on said frame in a transverse plane and cooperating with the profile of said template, a supporting member adapted to slide on said lever, means for securing said supporting member in a determined position on said lever, and a transverse link pivoted at one end on said supporting member and at the other end on said tool holder in order to control the cross feed of the latter.

2. An automatic machine for profiling tools, comprising in combination a frame, a work holder, means for rotating said work holder, two symmetrical tool holders, means for controlling the lengthwise feed of each tool holder, two symmetrical templates, means for imparting to said templates a translation parallel to said lengthwise feed of the tool holders and the speed whereof is in a determined ratio with that of said lengthwise feed and means cooperating with each template for controlling the cross feed of the corresponding tool holder in a determined ratio with the ordinates of the profile of said template, in order to profile the work on both sides at the same time.

3. An automatic machine for profiling tools, comprising in combination a frame, a work holder adapted to support a plurality of pieces, two symmetrical tool holders, each tool holder being adapted to hold a number of tools equal to the number of work pieces, means for controlling the lengthwise feed of each tool holder, two symmetrical templates, means for imparting to said templates a translation parallel to said lengthwise feed of the tool holders and the speed whereof is in a determined ratio with that of said lengthwise feed and means cooperating with each template for controlling the cross feed of the corresponding tool holder in a determined ratio with the ordinates of the profile of said template in order to profile the pieces of work on both sides at the same time.

In testimony whereof we have signed our names to this specification.

MARCEL ULYSSE RAMSAY.
DÉSIRÉ MARIE MOEGLEN.